United States Patent [19]

Evans et al.

[11] Patent Number: 5,243,641
[45] Date of Patent: Sep. 7, 1993

[54] EXTENDED RANGE CORDLESS TELEPHONE SYSTEM

[75] Inventors: James G. Evans, Colts Neck; Gregory Panagopoulos, Keasbey; James W. Smith, Middletown; Steve E. Witta, Toms River, all of N.J.

[73] Assignee: AT&T Bell Laboratories, Murray Hill, N.J.

[21] Appl. No.: 915,795

[22] Filed: Jul. 17, 1992

Related U.S. Application Data

[63] Continuation of Ser. No. 561,123, Aug. 1, 1990, abandoned.

[51] Int. Cl.$^5$ .............................. H04M 11/00
[52] U.S. Cl. ........................ 379/61; 379/60; 379/62
[58] Field of Search .............. 379/58, 60, 61, 62, 379/63; 455/34.1

[56] References Cited

U.S. PATENT DOCUMENTS

| | | |
|---|---|---|
| 4,456,793 | 6/1984 | Baker . |
| 4,741,019 | 4/1988 | Takahashi .............. 379/61 |
| 4,748,655 | 5/1988 | Thrower et al. ........ 379/60 |
| 4,759,051 | 7/1988 | Han ....................... 379/59 |
| 4,860,337 | 8/1989 | Shimura ................. 379/63 |
| 4,975,939 | 12/1990 | Sasaki .................... 379/60 |
| 4,980,907 | 12/1990 | Raith et al. ............. 379/61 |
| 5,020,094 | 5/1991 | Rash et al. ............. 379/61 |
| 5,067,147 | 11/1991 | Lee ........................ 379/60 |

FOREIGN PATENT DOCUMENTS 0089827 4/1989 Japan ......................... 455/34

OTHER PUBLICATIONS

*NTT Business Cordless Telephone*, Akio Sasaki, Kohji Momma, Tetsuro Hanazawa, *NTT Review*, vol. 1, No. 1, May 1989, pp. 40-44.
*Emerging Technology and Service Enhancement for Cordless Telephone Systems*, Takeshi Hattori, Akio Sasoki, Kohji Momma, *IEEE Communications Magazine* vol. 26, No. 1, Jan. 1985 pp. 53-58.

*Primary Examiner*—Jin F. Ng
*Assistant Examiner*—Dwayne D. Bost
*Attorney, Agent, or Firm*—Samuel R. Williamson

[57] ABSTRACT

An extended operating range is provided for a portable or handset unit operating within a cordless telephone system. The system employs multiple base units and multiple handset units, with only one of the multiple base units being activated at a time for communicating with a given handset unit. Each of the multiple handset units has an assigned or dedicated base unit with which only it may communicate. Other shared base units with which all the multiple handset units may communicate are also located in the system which supports multiple simultaneous users. An associated radio link control unit controls the activation and deactivation of the base units which are dispersed through a premises. This control unit also controls the connection of a voice path to the base unit actively communicating with a handset unit. As a user of a handset unit with a call in progress roams around the premises, this base unit monitors the quality of the signal received from the handset unit. If this signal quality deteriorates to below an acceptable level, the base unit notifies the radio link control unit which, in turn, initiates a polling procedure to identify and hand-off the communications to another base unit that is then receiving the signal from the handset unit with an acceptable signal quality. With no calls in progress, both base unit and handset unit transmitters are off thereby avoiding interference to other nearby cordless telephones. All receivers are active, however, in order to respond to incoming calls and service requests. Channel cycling and base unit polling procedures are advantageously employed to insure that incoming or outgoing calls are completed quickly, even though the location of a roaming handset unit may be unknown.

24 Claims, 5 Drawing Sheets

SYSTEM STATUS TABLE

| 1<br>BASE | 2<br>CHANNELS USED | 3<br>SECURITY CODE | 4<br>BASE CLASS | 5<br>DEDICATED HANDSET EXTENSION | 6<br>CALL STATUS | 7<br>TRANSMITTER STATUS |
|---|---|---|---|---|---|---|
| 12 | C1 | SC1 | DEDICATED | x101 | IDLE/ACTIVE | BASE/OFF |
| 13 | C1,C4 | SC1,SC4 | SHARED | — | IDLE/ACTIVE | BASE/OFF |
| 14 | C1,C4 | SC1,SC4 | SHARED | — | IDLE/ACTIVE | BASE/OFF |
| 15 | C4 | SC4 | DEDICATED | x102 | IDLE/ACTIVE | BASE/OFF |
| 16 | C1,C4 | SC1,SC4 | SHARED | — | IDLE/ACTIVE | BASE/OFF |
| 17 | C1,C4 | SC1,SC4 | SHARED | — | IDLE/ACTIVE | BASE/OFF |

EXTENDED RANGE CORDLESS TELEPHONE SYSTEM

This application is a continuation of application Ser. No. 07/561,123, filed on Aug. 1, 1990, abandoned.

BACKGROUND OF THE INVENTION

1. Technical Field

This invention relates to cordless telephone systems and more particularly to an arrangement for extending the operating range of a portable unit within a cordless telephone system.

2. Description of the Prior Art

Cordless telephones in the United States presently operate on ten separate frequency pairs (channels) in the 46/49 MHz band. These telephones have generally been used in the residential market to allow the user to make and receive telephone calls with a portable handset unit connected by a radio link to a fixed base unit. Because of radiated power limitations on the radio link, however, the handset unit must be used within a radius of a few hundred feet of the base unit. The actual range of operation in any given situation depends on the radio propagation characteristics of a particular premises, which are affected by the building material composition as well as the contents of the building. Generally, the operating range limitation has not been considered a shortcoming for the cordless telephones that are used in residential premises, but now that cordless telephones are being provided for use in business premises, this operating range limitation is considered a much more critical problem. Moreover, business premises generally provide a harsher electromagnetic environment than residential premises, with the building material composition and building contents being such that they significantly reduce the operating range of the cordless telephone from what it would otherwise be if operated in a residential premises. In addition, the business customer is more critical of communication problems than the residential customer and will view radio deadspots as unacceptable.

In order to cope with the limited operating range of the cordless telephone system, one multiple channel access system employs a dedicated common signaling channel to set up calls. Operation of the system is such that the handset unit bids for access to the plurality of radio frequency channels. Access to channels is provided by a centralized controller through a transceiver at a cell site. Since cordless telephones have been allocated a limited number of communication channels over which they may operate, this system has the disadvantage of reducing the available number of channels by minimally committing one of these as the common signaling channel. This system also has the disadvantage of requiring manual location registration wherein the user of the portable handset unit must remember to register the location of his or her handset unit, else the centralized controller will not known the whereabouts of this portable handset unit. One alternative to manual location registration is the suggestion of periodic polling of each portable handset unit through the transceivers at the cell sites. This is also undesirable, however, in that it may cause needless interference to users of other nearby cordless telephone systems.

In addressing the problems of limited available radio frequency spectrum and the resulting interference between transceivers operating at the same frequencies, one cordless telephone system employs a line-of-sight or optical transmission link for communications between portable handset units and dispersed base units. This system, described in U.S. Pat. No. 4,456,793, specifically utilizes modulated infrared transmissions between the portable handset units and each of the dispersed base units. Although this system generally avoids the problems associated with having limited available radio frequency spectrum, it has the disadvantage of having a limited operating range between base and handset units because of its line-of-sight operating requirement. It unfortunately thus requires a large number of base units dispersed through a premises in order to obtain the desired continuous coverage for a user of a handset unit as he or she roams through the premises.

SUMMARY OF THE INVENTION

In accordance with the invention, a cordless telephone system provides an extended operating range for a portable or handset unit within the system. The cordless telephone system comprises a plurality of handset units and a plurality of base units for communicating over a communication channel. The base units are dispersed so as to divide a location of the telephone system into a number of reception areas for telephone service with the handset units. A control unit connects to each of the plurality of base units for switching the telephone service for each handset unit between the plurality of base units. In accordance with a feature of the invention, at least one of the plurality of base units provides the telephone service only to a selected one of the plurality of handset units. This assures that a base unit will always be available for the user of a particular handset unit.

Operable as an adjunct to a private branch exchange (PBX) switch or a key system, the cordless telephone system employs multiple base units and multiple handset units, with only one of the multiple base units being activated at a time for communicating with a given handset unit. Each of the multiple handset units has an assigned or dedicated base unit with which only it may communicate. Each of the multiple handset units may also communicate with other shared base units which are also included in the system.

In further accordance with the invention, a radio link control unit within the cordless telephone system advantageously controls in preferred embodiments the activation and deactivation of the base units and the connection of the voice and PBX switch control paths to each active base unit, i.e., the base unit actively communicating with a handset unit. As a user of a handset unit with a call in progress roams around a premises, the active base unit monitors the quality of the signal received from the handset unit. If this signal quality deteriorates to below an acceptable level, the active base unit notifies the radio link control unit which, in turn, initiates a polling procedure to identify another base unit that is then receiving the signal from the handset unit with an acceptable signal quality. The control unit then simultaneously turns off the transmitter of the base unit with the unacceptable received signal quality and turns on the transmitter of the base unit with the acceptable received signal quality and moves the voice path to the new base unit. With no calls in progress, both base unit and handset unit transmitters are off, but all receivers are active in order to respond to incoming calls and service requests. Channel cycling and base unit polling procedures are advantageously employed to insure that incoming or outgoing calls are completed quickly, even though the location of a roaming handset unit is unknown.

BRIEF DESCRIPTION OF THE DRAWING

This invention and its mode of operation will be more clearly understood from the following detailed description when read when with the appended drawing in which.

Throughout the drawings, an element when shown in more than one figure is designated by the same reference numeral in each such figure.

DETAILED DESCRIPTION

Figure 1:
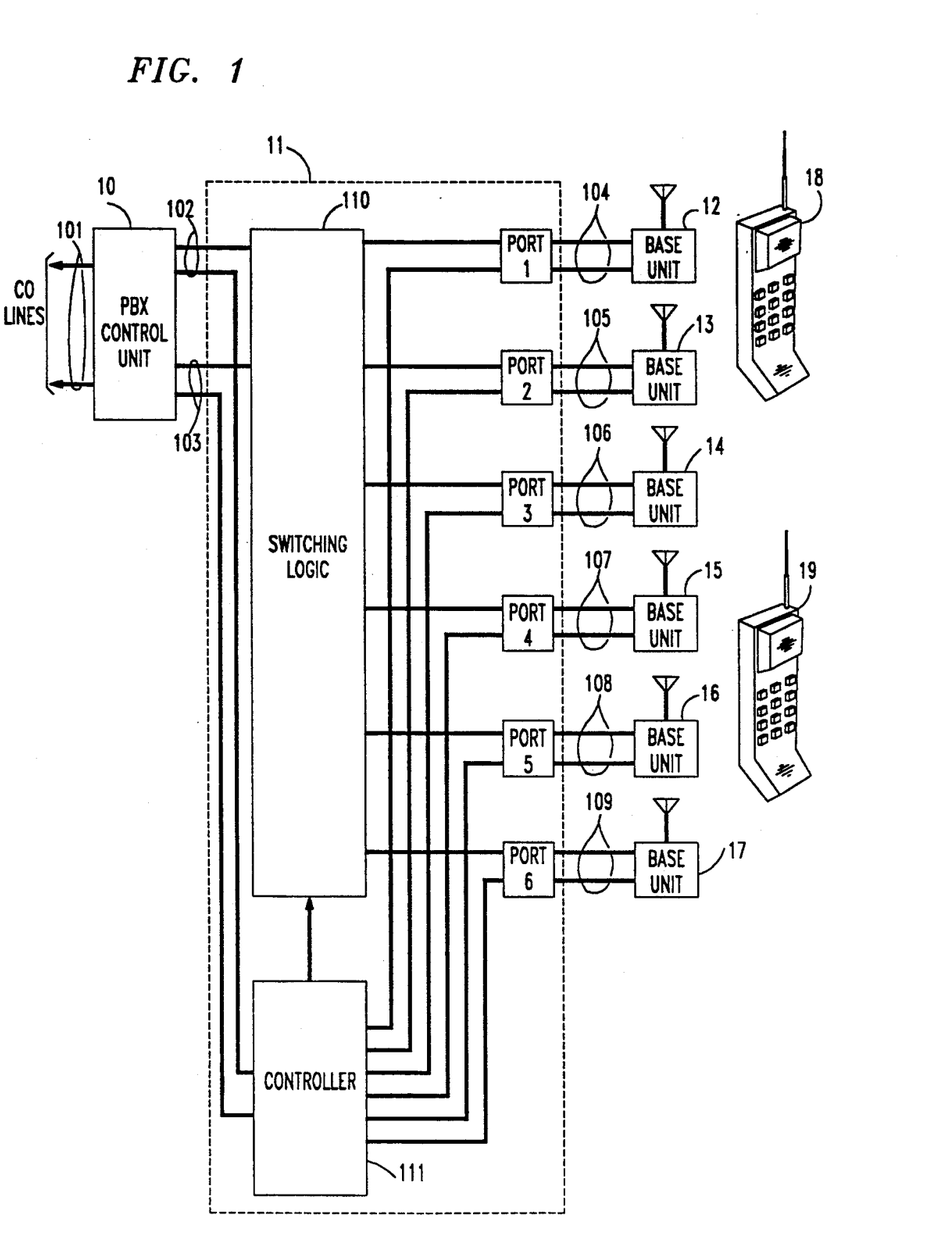
FIG. 1 is a block diagram of a cordless telephone system including a radio link control unit and both multiple base units and handset units in the system operating as an adjunct to a PBX switch in accordance with the invention.

Referring now to FIG. 1, there is shown a private branch exchange (PBX) control unit 10, a radio link control unit 11, multiple fixed telephone base units 12 through 17 and multiple portable handset units 18 and 19. The PBX control unit 10 is employed in a PBX switch (not shown) and controls the routing of incoming calls to the switch received over multiple central office leads 101 as well as those intercommunication calls placed between two telephone units within the PBX switch. The radio link control unit 11, the base units 12 through 17 and the handset units 18 and 19 comprise a cordless telephone system which operates as an adjunct to the PBX switch in accordance with the invention.

The radio link control unit 11 coordinates the overall operation of the cordless telephone system. This control unit 11 serves as an adjunct switch for interconnecting calls within the PBX switch directed to and from handset units 18 and 19 through respectively associated extension leads 102 and 103. Telephone calls originated and received at handset units 18 and 19 are also routed through one of the plurality of multiple base units 12 through 17 via the radio link control unit 11. The radio link control unit 11 also coordinates the handing off of handset units between base units and the search for a roaming handset unit during an incoming call.

The analog terminal line (ATL) protocol is employed in the PBX switch. It is to be understood that the cordless telephone system also is operable in PBX switches and key telephone systems employing other protocols. The ATL protocol defines an information transport path between the PBX control unit 10 and the radio link control unit 11 as well as between the radio link control unit 11 and each of the multiple base units 12 through 17. The protocol employs a three-level hierarchical structure. The low, intermediate and high levels are designated as Line, Link and Message respectively. Interconnection between units is provided via a standardized four-pair interface with the four pairs being allocated into (1) voice-1, (2) voice-2, (3) control and (4) power.

Information between the radio link control unit 11 and the base units 12 through 17 is communicated in three ways in accordance with the ATL protocol. First, the radio link control unit 11 transmits command messages to a base unit. No specific response message is required by the base unit from the radio link control unit. Second, the radio link control unit 11 queries a base unit for information and a response message is expected. Lastly, a base unit transmits an unprompted message to the radio link control unit 11 and a response message may or may not be expected. These messages are exchanged during the time, typically once every 25 milliseconds, when the radio link control unit 11 polls each base unit. All messages received either by a base unit or the radio link control unit 11 cause an acknowledgment to be returned to the sender. If the sender's message requires information to be returned to him or her, the returned information serves as the acknowledgment. If the sender's message does not require information to be returned, an explicit acknowledge message is returned.

The radio link control unit 11 contains a switching logic module 110 that connects ATL leads from the PBX control unit 10 to the multiple base units 12 through 17 through ATL ports designated 1 through 6. Additionally, the radio link control unit 11 contains a controller 111 for executing a process or program for performing the functions provided by the cordless telephone system and those required by the ATL protocol. This controller 111 may be implemented through the use of a microcomputer containing read-only-memory (ROM), random-access-memory (RAM) and through use of the proper coding. Such a microcomputer is known in the art and is readily available from semiconductor manufacturers such as Signetics, Intel and AMD.

In accordance with the invention, two modes of base unit operation are employed in providing telephone service to the handset units: dedicated base units and shared base units. A dedicated base unit is usable only by a designated handset unit whereas a shared base unit is usable by any handset unit operating in the cordless telephone system. Assigning each handset unit to a dedicated base unit assures that a base unit, typically located on a user's desk or within that user's immediate surroundings, will always be available for that user to access. By way of example, base unit 12 is dedicated to handset unit 18 and base unit 15 is dedicated to handset unit 19. And handset unit 18 is assigned within the PBX control unit 10 to extension line 102 and handset unit 19 is assigned to extension line 103. Base units 13, 14, 16, and 17 are shared units which are strategically distributed through a building to maximize the operating range for a handset unit operating in the cordless telephone system.

In operation by way of a brief example, if handset unit 18 is communicating with base unit 12 and wanders out of the operating range of this base unit into the operating range of a shared base unit, handset unit 18 will be handed off from base unit 12 to the shared base unit. In this hand-off, the radio link between base unit 12 and handset unit 18 will be terminated and a new radio link between the shared base unit and handset unit 18 will be established. Thus, handset unit 18 may be handed off to all base units except base unit 15 since this base unit is similarly dedicated to handset unit 19. Also, since each handset unit is assigned or responsive to a unique extension, upon receipt of an incoming call for this handset unit, the handset unit is located by this shared base, as described later herein, and the incoming call is routed to this handset unit through this nearby shared base unit.

The radio link control unit 11 provides for coordinating the search for a handset unit during an incoming call. Because of the potential for causing needless interference, it is undesirable to provide communications in a cordless telephone system via a radio link when a call is neither active nor being originated. Thus the cordless telephone system is advantageously arranged to quickly locate a roaming handset unit upon receipt of an incoming call. When an incoming call is received, the dedicated base unit and the idle shared base units are polled such that each base unit attempts to locate the handset unit. This polling process is fully described later herein and with reference to FIG. 3.

Figure 2:
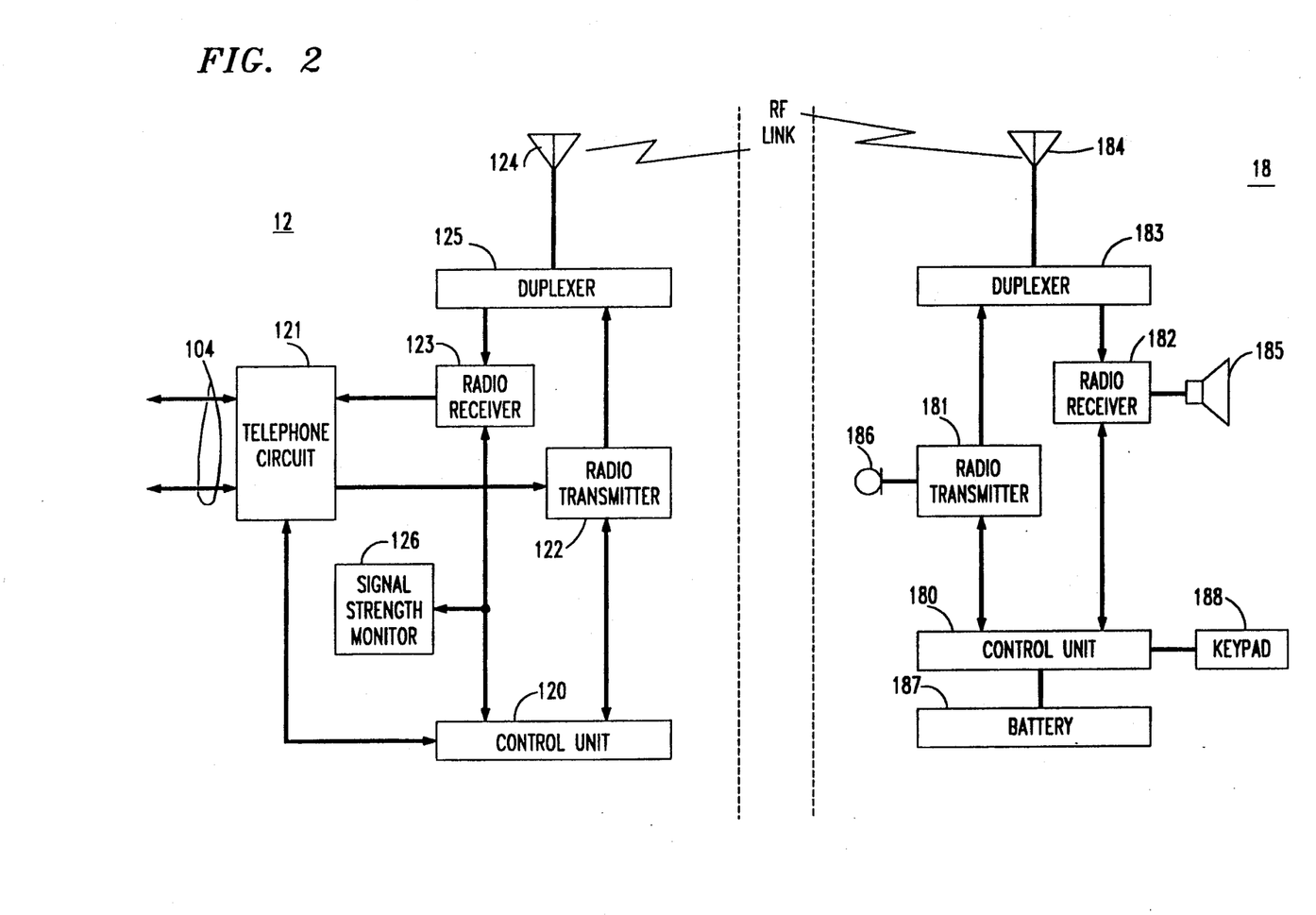
FIG. 2 is a block representation of the major functional components of one of the handset units and one of the base units depicted in FIG. 1, operative in accordance with the invention.

Referring next to FIG. 2, there is shown a block representation of the major functional components of the base unit 12 and the handset unit 18, both depicted in FIG. 1 and operative in an extended range cordless telephone system in accordance with the principles of the invention. With regard to the functional components illustratively described in base unit 12, the dedicated base units and the shared base units of FIG. 1 incorporate these same components and are operationally identical. Similarly, the handset unit 19 incorporates the same components as handset unit 18 and is also operationally identical.

Included in the base unit 12 is a control unit 120 which advantageously provides a number of control functions. This control unit 120 interfaces with a control unit 180 in the handset unit 18 and, while the handset 18 is located in a mating cradle in the base unit 12, generates and transfers security code data to the control unit 180 in accordance with the teachings of U.S. Pat. No. 4,736,404 issued to R. E. Anglikowski, et al. on Apr. 5, 1988. This control unit 120 also compares the received security code data with its stored security code data during the establishing of a two-way radio frequency (RF) communications link between the handset unit 18 and the base unit 12. A favorable comparison of the data from the two security codes must be achieved in order for the base unit 12 to respond to a request-for-service signal from a handset unit. This control unit 120 also receives and processes opcode data provided by the handset unit 18 for dialing and providing signaling information out to the radio link control unit 11 via a telephone circuit 121 and over ATL leads 104. Control unit 120 may be implemented through the use of a microcomputer containing ROM, RAM and through use of the proper coding. Such a microcomputer is known in the art and is readily available from semiconductor manufacturers such as Signetics, Intel and AMD.

Both the base unit 12 and the handset unit 18 are operable on a plurality of communication channels. The control unit 120 configures a radio transmitter 122 and a radio receiver 123 in the base unit 12 for proper operation on the selected one of the plurality of channels when actively communicating with the handset unit 18. The control unit 120 also provides the appropriate channel control information to the handset unit 18.

The transmit and receive signals of the base unit 12 are coupled to a duplexer 125 which permits the transmitter 122 and the receiver 123 to both simultaneously operate over antenna 124 while preventing the output of transmitter 122 from being coupled directly to the input of the receiver 123. When the base unit is in an idle state awaiting an incoming telephone call or a request-for-service signal from a handset unit, transmitter 122 is turned off while receiver 123 remains on to detect the request-for-service signal. The telephone circuit 121 serves as an interface for control signals provided over the ATL leads 104 between the radio link control unit 11 shown in FIG. 1 and the control unit 120. The telephone circuit 121 also serves as the interface for voice signals over the ATL leads 104 which are sent to transmitter 122 and received from receiver 123.

Referring next to the handset unit 18, there is shown the control unit 180 which stores the security code data that is generated by the base unit 12 and provided to the handset unit 18. This security code data stored in control unit 180 is transmitted from the handset unit 18 to the base unit 12 while establishing initial communications through a request-for-service signal as well as during the transfer of subsequent opcode data to the base unit. These signals are transmitted in a frequency shift keying (FSK) format and includes a synchronizing signal immediately followed by a data field which includes the security code generated by the control unit 120. Like the control unit 120, this control unit 180 may be implemented through the use of a microcomputer containing ROM, RAM and through use of the proper coding. Such a microcomputer is known in the art and is readily available from semiconductor manufacturers such as Signetics, Intel and AMD.

Communications with the base unit 12 are provided via a radio transmitter 181 and a radio receiver 182 in the handset unit 18. The output of the transmitter 181 and input for the receiver 182 are commonly coupled through a duplexer 183 to an antenna 184. The receiver 182 demodulates voice signals transmitted by the base unit 12 and couples these signals to an acoustical device such as, for example, loudspeaker 185. The transmitter 181 has as its input speech signals from a microphone 186, security code data from control unit 180 and opcode data representative of entries on a keypad 188, all of which it transmits to the base unit 12. The key pad 188 is used for entering dial digits and control functions executable by the control unit 180 or transmitted to the base unit 12. A battery 187 is also included in the handset unit 18 for providing operating power for all circuitry in this unit.

In order to conserve battery power, a controlled power up/power down mode of operation for the handset unit 18 is implemented in accordance with the teachings of U.S. Pat. No. 4,731,814 issued to W. R. Becker et al. on Mar. 15, 1988. The battery 187 in the handset unit is normally charged while the handset unit is placed in a cradle located in, for example, its dedicated base unit. When the handset unit is removed from this base unit and is in an idle or standby state awaiting a telephone call, power to the control unit 180, receiver 182 and certain other selected circuitry in the handset unit 18 is controlled to minimize power consumption. Power to other non-essential circuitry in the handset unit 18 is turned completely off during this state. The handset unit automatically turns on to a full operating mode from the controlled power up/power down mode in response to events such as a user depressing a key on the keypad 188 or the receipt of a ring indication from a base unit, the ring indication being indicative of an incoming call directed to the handset unit.

Figure 3:
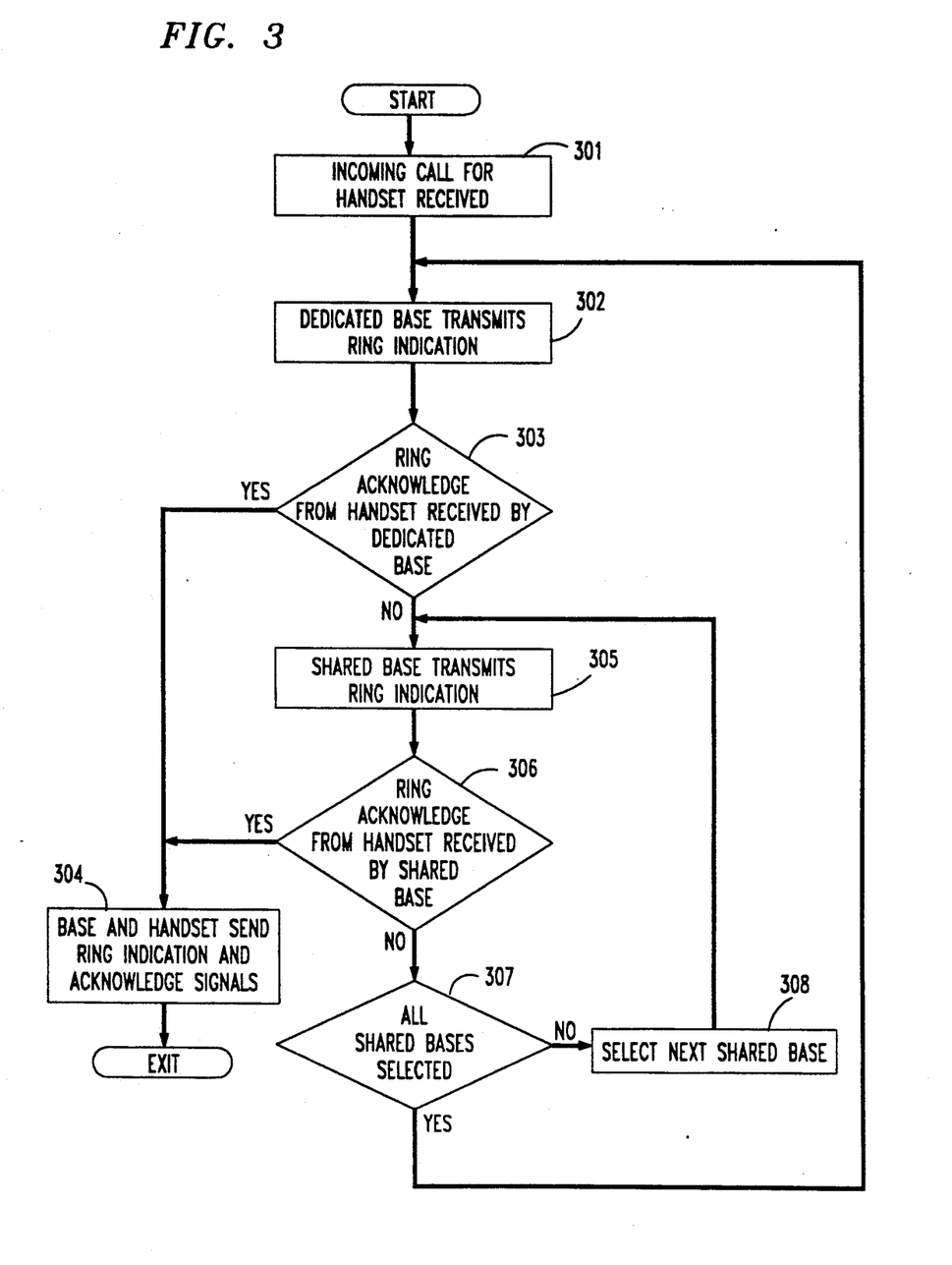
FIG. 3 is a flow diagram of a process suitable for incorporating into the radio link control unit of the cordless telephone system of FIG. 1 in accordance with the invention.

With reference to FIG. 3, there is shown a flow chart illustrating the operation of the radio link control unit 11 in routing an incoming (or intercommunication) call and providing telephone service to the correct handset unit via the appropriate base unit. Initially, the PBX control unit 10, shown in FIG. 1, determines whether the assigned extension for the handset unit to which the incoming call is directed is busy or idle. If the extension is busy, either a busy signal is provided to the calling party, a call waiting signal provided to the called party, or other alternate routing determined by the configuration of the PBX control unit 10 is executed. If the extension is idle, then the incoming call is routed to the radio link control unit. The functions performed by controller 111 of FIG. 1 in routing the incoming call to the intended handset unit are advantageously determined by a process or program contained in the memory (not shown) located in this controller.

The process is entered at step 301 where the incoming call is received. Also at this step, the process determines the correct dedicated base unit for the handset unit having the extension over which the call is being received and, in step 302, causes a ring indication to be transmitted from this base unit. The process advances to decision 303 to check for the receipt of a ring acknowledge from the handset unit associated with the dedicated base unit. If a ring acknowledgment is received by the dedicated base unit, then the process advances to step 304 where the signaling base unit continues to send a ring indication and the called handset unit, in return, continues to send a ring acknowledgment until the called handset unit goes off-hook or the incoming call is terminated.

If at decision 303, a ring acknowledgment is not received by the dedicated base unit, the process advances to step 305 where the process causes a first one of the shared base units to transmit a ring indication to the handset unit having the assigned extension over which the call is being received. The process next advances to decision 306 where it checks to see if a ring acknowledge from the called handset unit is received by the signaling shared base unit. If a ring acknowledgment is received by the first one of the shared base units, then the process proceeds to step 304 where this base unit continues to send a ring indication and the called handset unit, in return, continues to send a ring acknowledgment until the called handset unit goes off-hook or the incoming call is terminated.

If a ring acknowledge from the called handset unit is not received by the first one of the shared base units in decision 306, the process advances to decision 307 where a determination is made as to whether all shared base units have been selected for sending a ring indication to the handset unit having the assigned extension over which the call is being received. If all shared base units have not been selected, the process advances to step 308 where a next one of the shared base units is selected by the radio link control unit. The process then returns to step 305 where this selected shared base unit transmits a ring indication to the handset unit having the assigned extension over which the call is being received. The process determined by steps 305 and 308 and decisions 306 and 307 is repeated until all shared base units are selected for signaling the called handset unit or a ring acknowledge is received by the signaling one of the shared base units. If all shared base units have been selected and no ring acknowledge received from the called handset unit, the process returns to the step 302 where the dedicated base unit once again transmits a ring indication in its attempt to find the called handset unit. This process is repeated until the called handset unit is located or the incoming call is terminated. Although the period is adjustable, the radio link control unit 11 is arranged to typically cycle through all the base units approximately every six seconds.

Figure 4:
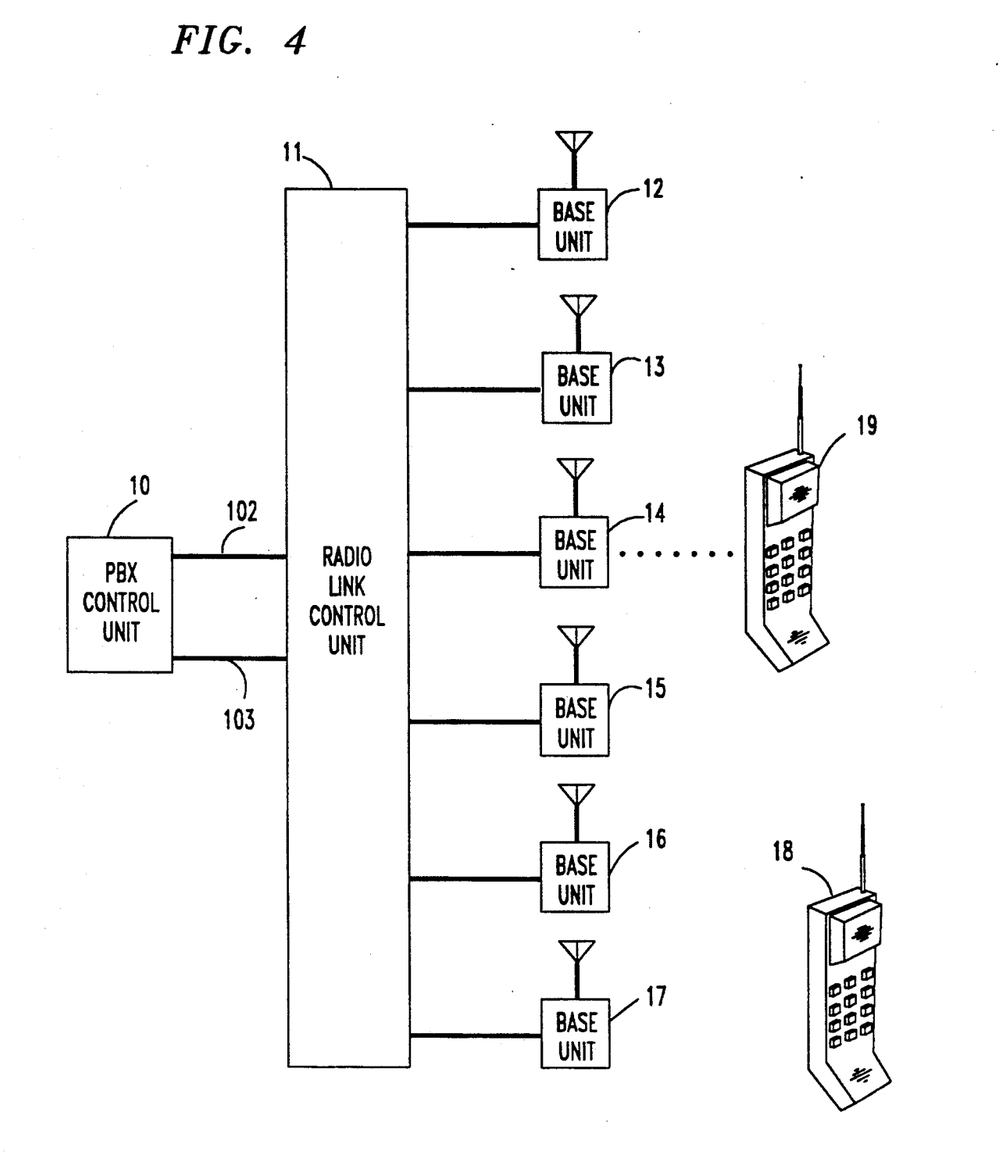
FIG. 4 shows the telephone system of FIG. 1 with the handset units and the base units of this system operating according to the process described in FIG. 3 and in accordance with the invention.

As a further illustration of this polling operation, reference is made next to FIG. 4 which shows the cordless telephone system of FIG. 1 and further shows the operation of handset units 18 and 19 when communicating with other than their respectively dedicated base units. Although FIG. 4 is functionally equivalent to FIG. 1, some of the detail of FIG. 1 is not again shown in FIG. 4 for ease of understanding and for highlighting the specific teaching illustrated in FIG. 4. As in FIG. 1, base unit 12 in FIG. 4 is the dedicated base unit for the handset unit 18 and base unit 15 is the dedicated base unit for the handset unit 19. Initially, handset unit 18 is in the range of base unit 17 and is idle, and handset unit 19 is within the range of and communicating with base unit 14. An incoming call over extension 102 (lead 102) for handset unit 18 is received by the radio link control unit 11. This control unit 11 causes dedicated base unit 12 to transmit a ring indication that is not received by handset unit 18 since this handset is not then within the reception range of the transmitted signal from base unit 12. Base unit 12 then informs the radio link control unit 11 that a response was not received from the handset unit 18. The radio link control unit 11 next causes a ring indication to be transmitted, for example, by shared base unit 13 to the handset unit 18. This signal is also not received and base unit 13 informs the radio link control unit 11 that a response was not received from the handset unit 18. The radio link control unit 11 skips base unit 14 since this base unit is communicating with handset unit 19. The radio link control unit 11 also skips base unit 15 since this base unit is dedicated to handset unit 19. The radio link control unit 11 next causes base unit 16 to transmit a ring indication which also is not received and base unit 16 informs the radio link control unit 11 that a response was not received from the handset unit 18. Finally, the radio link control unit 11 causes base unit 17 to transmit a ring indication that is received and acknowledged by the handset unit 18 which is within the reception range of base 17. The radio link control unit 11 then routes the incoming call to base unit 17.

In order for an idle handset unit to request service from a base unit (e.g., to originate a call or change channels), the handset unit must be within the operating range of a base unit and the base unit must be on the same channel as the handset unit. An idle dedicated base unit always monitors the same channel on which its assigned handset unit last operated and each idle shared base unit cycles through and monitors each channel known to be used by a handset unit in the cordless telephone system. The radio link control unit 11 advantageously informs the base units of the channels being used by the handset units as well as when a handset unit is changed from one operating channel to another. If a user executes a channel change operation on the handset unit he or she is then using, this information is passed via the active base unit back to the radio link control unit 11, which informs the other base units of the change. Thus, if the handset unit is communicating with its dedicated base unit when the user changes channels, the shared base units are informed of the change and which new channel to periodically go to and monitor in order to receive a service request from that handset unit. Similarly, if the handset unit is communicating with a shared base unit when the user changes channels, the other shared base units are informed of the handset unit changing channels and which new channel to also periodically go to and monitor (one channel for each handset unit operating in the system). The dedicated base unit is also informed of the new channel which it must monitor.

Channel cycling is employed by the idle shared base units to assure that all handset units service requests are received when a handset unit is beyond the operating range of its dedicated base unit. In the operation of channel cycling, each shared base unit is informed by the radio link control unit 11 of the frequency channels being used by each handset unit. Idle shared base units then listen for service requests on each one of the channels assigned to a handset unit operating within the cordless telephone system. The idle shared base units cycle through each of the channels, dwelling for a short period, typically 0.5 seconds, on each channel in order to receive any service requests from a handset unit then using that channel. The channel cycling operation is executed by an idle shared base unit until either a task of greater priority is presented by the radio link control unit 11 or it receives a service request from a handset unit.

When either a dedicated or idle shared base unit receives a service request from a handset unit, the base informs the radio link control unit 11 of the request. The radio link control unit 11 then grants permission to the base unit to establish a radio link with the handset unit. If more than one base unit receives the service request, the radio link control unit 11 grants permission to the first base unit that receives the handset unit with the best radio link quality, to be described in greater detail later herein, and inform the other base units to ignore the service request. The radio link control unit 11 also switches the ATL control signals to the appropriate base unit.

The radio link control unit 11 insures that no two handset units will occupy the same frequency channel at the same time. A user of a handset unit may select a channel for operation that is different from the one selected by the cordless telephone system during initialization, for example. Because the radio link control unit 11 monitors and controls the channels selected for use by all handset units, it prevents the selection of a frequency channel previously selected by another handset unit. Thus, if a user initiates a channel change, the base unit with which the handset unit is then communicating will only change (and cause the handset to follow) to a channel not in use by or previously selected and presently occupied by any other handset unit.

The radio link control unit 11 also informs the shared base units of the security codes that they are allowed to recognize. Selection of a security code for each handset unit is respectively provided by its dedicated base unit. Each one of these dedicated base units randomly selects the code and transfers it to the associated handset unit each time the handset unit is placed in a mating cradle in the dedicated base unit. In the same manner in which it monitors the frequency channels selected by the handset units, the radio link control unit 11 similarly monitors the security codes selected by the dedicated base units. If a second dedicated base unit happens to select a security code that is then being used by a first dedicated base unit and handset unit combination, the radio link control unit 11 instructs the second base unit to select another security code. The base units are thus controlled such that no two dedicated base units will be able to have the same security code at the same time. Thus, when a user returns his handset unit to the dedicated base unit, this base unit will be allowed to only select a security code that is not then being used by any other base unit and handset unit combination.

In order to achieve continuous coverage throughout a premises, each active base unit includes signal strength monitoring circuitry for monitoring the strength of the received signal from the handset unit while communicating with that handset unit. Although the signal strength monitoring circuitry is provided in the base unit, it is understood that such monitoring may also performed with similar circuitry includable in the handset unit. When the received signal strength deteriorates to below an acceptable level, an active base unit determines that its radio link quality is poor and informs the radio link control unit 11 which then instructs all idle shared base units (and the dedicated base unit, if it is idle) to listen on the appropriate channel and report radio link quality (GOOD/TOLERABLE/POOR) to the radio link control unit.

In response to a request from the radio link control unit 11 to idle base units to report radio link quality, a dedicated base unit just determines radio link quality and reports it to the radio link control unit. Idle shared base units, however, suspend the channel cycling process, determine the radio link quality for the appropriate channel, reports it to the radio link control unit, and then resume channel cycling. As the base units are polled, the data reflective of the radio link quality for the appropriate channel is received and interpreted by the radio link control unit 11 which, in turn, selects the appropriate new base unit for handing off the handset unit thereto and establishing communications therewith. The hand-off is accomplished as follows: the radio link control unit instructs both the old and the new base units to mute their voice paths, instructs the new base unit to turn on its transmitter, switches the control ATL lead to the new base unit, instructs the old base unit to turn off its transmitter, and instructs both base units to unmute their voice paths.

In preferred embodiments, each of the base units detect radio link quality through use of the signal strength monitor circuit 126 shown in FIG. 2 which may be, for example, a received signal strength indicator (RSSI) circuit. The RSSI circuit produces an output voltage that is proportional to the strength of the received signal from the handset unit. The base unit then compares this voltage relative to both a predetermined upper and a lower threshold level. An output above the higher threshold level indicates a GOOD link, an output between the two threshold levels indicates a TOLERABLE link, and an output below the lower threshold level indicates a POOR link. If a POOR link exists between the handset unit and the base unit, the radio link control unit 11 first attempts to hand-off the handset unit to a base unit with a GOOD link. If after polling all available idle base units, no base unit is found with a GOOD link, the radio link control unit 11 immediately executes a hand-off of the handset unit to the first base unit found with a TOLERABLE link. If no base unit was found with a TOLERABLE link, the radio link control unit 11 does not hand-off the handset unit. Rather, the control unit 11 causes the base unit to generate an audible and distinctive tone which is recognizable to the user that he or she is then approaching the outer limit of the operating range for that handset unit in the cordless telephone system.

A carrier detect circuit may alternatively be employed as the signal strength monitor circuit 126 in detecting radio link quality. As provided in the RSSI circuit, the carrier detect circuit similarly provides the base unit with the capability of determining if a handset unit has been detected. By way of example, operation of the carrier detect circuit in the 46/49 MHz cordless telephone channels is such that when a carrier is present (i.e., a transmitter operating at the base unit's receiver frequency), the power of the baseband signal is negligible beyond 4 KHz. When no carrier is present, there is significant power (white noise) out to 15 KHz. And the carrier detect circuit checks for the presence of power at 9 KHz. Thus if power is detected, it is assumed that there is no carrier and that a handset unit has not been detected or that the radio link quality is bad. If power is not detected, however, it is assumed that there is a carrier, a handset unit has been detected and that the radio link quality is GOOD. As provided with the RSSI circuit, the hand-off of the handset unit is then made to the first base unit reporting a good radio link quality.

Figure 5:
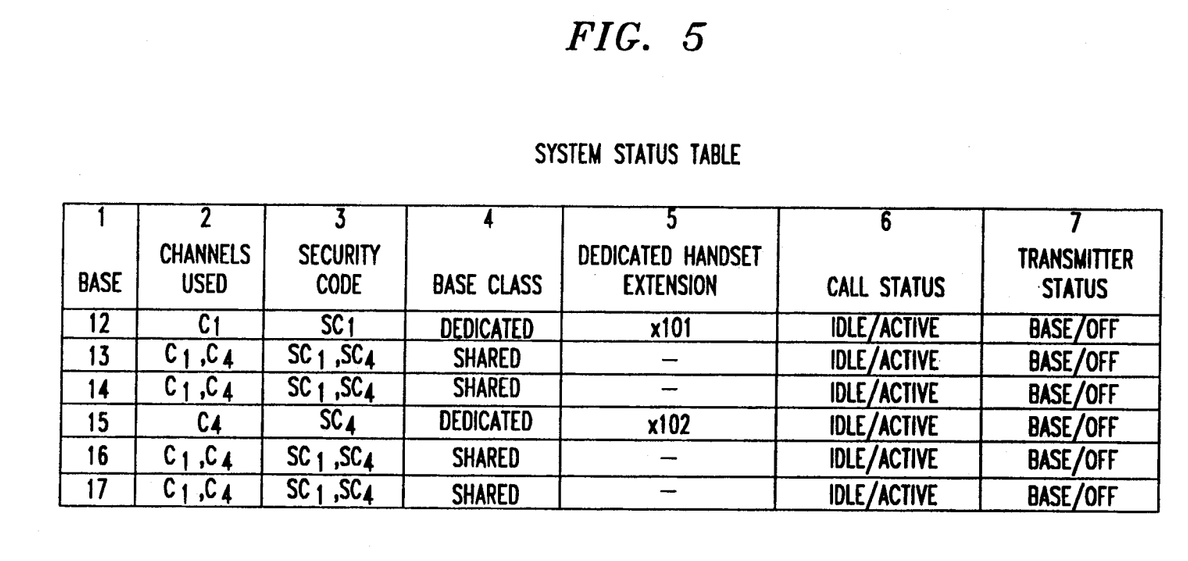
FIG. 5 shows a system status table of information for the cordless telephone system shown in FIG. 1 in accordance with the invention.

In coordinating the overall operation of the cordless telephone system, the radio link control unit 11 is required to receive and maintain certain information from the base units and, in return, provide some portions of this information to the base units for updating their operating conditions. With reference to FIG. 5, there is illustratively shown a system status table of information with values that are provided at system initialization for the cordless telephone system shown in FIG. 1. Reference is also made to FIGS. 1 and 2 for illustrating the applicable components of the cordless telephone system which correspond to those entries made in the system status table. For example, the entries in column 1 of the table correspond to the base units shown in FIG. 1.

After initialization, the radio link control unit 11 first requests that the dedicated base units 12 and 15 provide data indicative of their respectively selected frequency channels and security codes. Upon receipt of this information, the radio link control unit 11 completes entries 2, 3, 5 and 6 of columns 2 and 3 of the table. These entries are respectively for shared base units 13, 14, 16 and 17 shown in column 1. Next, the radio link control unit 11 transmits these table entries to these shared based units informing them of the channels they are to periodically monitor and the security codes they are to recognize.

The base unit class of DEDICATED or SHARED is defined in column 4 of the table and the dedicated handset unit extensions are entered in column 5. Each dedicated handset unit has an assigned extension on the PBX switch over which it makes and receives telephone calls. Column 6 defines the call status of each base unit. All entries in this column are initially IDLE. When a call is in progress, the base which is communicating with the handset unit involved in the call is assigned a call status of ACTIVE.

The transmitter status of each base unit is indicated in column 7. The transmitter status is BASE when the transmitter is under the control of the base unit, and is OFF when the transmitter in the indicated base unit is turned off by the radio link control unit 11. With the status of BASE assigned to a transmitter, a base unit is permitted to go directly off-hook during the initiation of a call or on-hook upon the completion of a call. When a transmitter in a base unit has been assigned the status of OFF, the radio link control unit 11 directly controls the enabling of the transmitter. The OFF status is therefore used by the radio link control unit 11 for switching transmitters and achieving a proper hand-off for a roaming handset unit from one base unit to another base unit.

Various other modifications of this invention are contemplated and may obviously be resorted to by those skilled in the art. For example, the polling process depicted in FIG. 3 and executed by the base units in finding a roaming handset could be configured such that the base unit covering the last known location of the roaming handset is the first one that attempts to locate the handset by transmitting a ring indication upon receipt of an incoming call. This alternative implementation of the process allows the radio link control unit to give preference to the last known location of the handset which in many situations will also be the location at the time of the incoming call. Those locations closest to the last known location could also be given a higher order of preference in the search for the handset unit.

Another alternative implementation of the invention that is contemplated is a modification to the channel cycling process such that each idle shared base unit not only listen on the designated frequency channels in the cordless telephone system to detect a service request from the handset units in the system, but also to monitor and report its own radio link quality of a radio link existing during communications between a handset unit and another base unit. The dedicated base unit similarly monitors its designated frequency channel when it is not communicating with its handset and reports its radio link quality of any communications on its designated frequency channel to the radio link control unit. The radio link control unit then stores and continually updates this information in temporary memory in its controller. In this manner, the radio link control unit accumulates data reflective of radio link quality from all of the idle base units. As a user of a handset approaches the edge of the coverage area of a base unit, the radio link control unit already has available the information it needs to execute a hand-off to the appropriate base unit. Since the radio link control unit may be informed of the actual dispersement of the base units, such data could also be utilized in predicting the probability of the handset unit moving into a certain location covered by a specific base unit. These alternative implementations may be advantageously obtained through an alteration of the process or program contained in memory in the controller 111 of the radio link control unit 11. It is therefore to be understood that within the scope of the appended claims, the invention may be practiced otherwise than as specifically described.

We claim:

1. A cordless telephone system comprising:
   a plurality of handset units each having a first transmitter and a first receiver;
   a plurality of base units each having a second transmitter and a second receiver for respectively transmitting to the first receiver and receiving from the first transmitter in the handset units over a communication channel, the base units being dispersible so as to divide a location of the telephone system into a number of reception areas for telephone service with the handset units;

a control unit for switching the telephone service for each handset unit between the plurality of base units;

at least one of the plurality of base units being assigned to and dedicated to a selected one of the plurality of handset units for providing the telephone service only to the selected one of the plurality of handset units, the plurality of base units further comprising shared base units, each shared base unit including means for providing telephone service to each one of the plurality of handset units; and monitoring means in each one of the plurality of base units, the monitoring means in the dedicated base unit monitoring the communication channel selected by the selected one of the plurality of handset units and the monitoring means in each shared base unit monitoring the communication channel selected by each one of the plurality of handset units, in response to the monitoring means, the dedicated base unit and the shared base units providing telephone service to the selected one of the plurality of handset units during movement of the handset unit from a first reception area for a first one of the plurality of base units to a second reception area for a second one of the plurality of base units essentially without interruption over the selected communication channel, including the provision of uninterrupted service during the selected handset unit's movement from the reception area of its dedicated base unit to a reception area of a shared base unit.

2. The cordless telephone system of claim 1 wherein the plurality of base units and the plurality of handset units are arranged to respectively communicate over any one of a plurality of communication channels.

3. The cordless telephone system of claim 2 wherein each one of the plurality of handset units includes means for selecting a specific one of the plurality of communication channels for obtaining telephone service from each of the plurality of base units.

4. The cordless telephone system of claim 3 wherein each shared base unit includes means for monitoring each communication channel selected by each one of the plurality of handset units for receipt of a request-for-service signal from any one of the plurality of handset units.

5. The cordless telephone system of claim 4 wherein the monitoring means is suitably arranged for cycling the second receiver in each shared base unit to the communication channel selected by each of the plurality of handset units for detecting the request-for-service signal.

6. The cordless telephone system of claim 3 wherein the control unit includes means for polling each one of the plurality of base units for locating an identified one of the plurality of handset units, the polling means including means for sequentially transmitting a coded message signal from the second transmitter in each base unit over the specific one of the plurality of communication channels selected by the identified one of the plurality of handset units.

7. The cordless telephone system of claim 6 wherein the coded message signal comprises a ring indication signal provided to the identified one of the plurality of handset units in response to receipt of an incoming call received by the control unit for this handset unit.

8. A cordless telephone system comprising:

a plurality of handset units each having a first transmitter and a first receiver;

a plurality of base units each having a second transmitter and a second receiver for respectively transmitting to the first receiver and receiving from the first transmitter in the handset units over a communication channel, the base units being dispersible so as to divide a location of the telephone system into a number of reception areas for telephone service with the handset units;

a control unit for switching the telephone service for each handset unit between the plurality of base units;

the plurality of base units including dedicated base units, each dedicated base unit being assigned to and providing telephone service only to a selected one of the plurality of handset units, the plurality of base units further comprising shared base units, each shared base unit including means for providing telephone service to each one of the plurality of handset units; and monitoring means in each one of the plurality of base units, the monitoring means in each dedicated base unit monitoring the communication channel selected by the selected one of the plurality of handset units and the monitoring means in each shared base unit monitoring the communication channel selected by each one of the plurality of handset units, in response to the monitoring means, the dedicated base unit and the shared base units providing telephone service to the selected one of the plurality of handset units during movement of the handset unit from a first reception area for a first one of the plurality of base units to a second reception area for a second one of the plurality of base units essentially without interruption over the selected communication channel, including the provision of uninterrupted service during the selected handset unit's movement from the reception area of its dedicated base unit to a reception area of a shared base unit.

9. The cordless telephone system of claim 8 wherein each dedicated base unit includes means for monitoring a first specific communication channel selected by its assigned one of the plurality of handset units for receipt of a request-for-service signal from this handset unit.

10. The cordless telephone system of claim 9 wherein each handset unit includes means for selecting a second specific communication channel for obtaining telephone service from each of the plurality of base units and each dedicated base unit includes means for monitoring this second specific communication channel in response to its assigned one of the plurality of handset units selecting this second specific communication channel.

11. The cordless telephone system of claim 10 wherein each one of the plurality of handset units has associated therewith a unique security code generated by the dedicated base unit, the specific communication channel being selected at its assigned handset unit for obtaining telephone service from the plurality of base units.

12. The cordless telephone system of claim 11 wherein the control unit includes means for controlling the selection of the security code by the dedicated base unit for use by its assigned handset unit and for selection of the specific communication channel for use by this handset unit, the control unit preventing the same security code and communication channel from being assigned to more than one of the plurality of handset units.

13. A method of extending the operating range of a cordless telephone having a plurality of handset units with a first transmitter and a first receiver, and a plurality of base units with a second transmitter and a second receiver for respectively transmitting to the first receiver and receiving from the first transmitter in the handset units over a communication channel, the method comprising the steps of:

dispersing the base units so as to divide a location of the cordless telephone into a number of reception areas for telephone service with the handset units;

connecting each of the plurality of base units for switching telephone service for each handset unit between the plurality of base units;

dedicating at least one of the plurality of base units for providing the telephone service in a selected reception area only to an assigned selected one of the plurality of handset units;

arranging base units in the plurality of base units as shared base units, each shared base unit providing telephone service to each one of the plurality of handset units;

monitoring in the dedicated base unit the communication channel selected by the assigned selected one of the plurality of handset units;

monitoring in each shared base unit each communication channel selected by each one of the plurality of handset units; and providing in the dedicated base unit and the shared base units telephone service to a one of the plurality of handset units during movement of the handset unit from a first reception area for a first one of the plurality of base units to a second reception area for a second one of the plurality of base units essentially without interruption over the selected communication channel, including the provision of uninterrupted service during the selected handset unit's movement from the reception area of its dedicated base unit to a reception area of a shared base unit.

14. The method of extending the operating range of a cordless telephone pursuant to claim 13 further comprising the step of arranging the plurality of base units and the plurality of handset units to respectively communicate over any one of a plurality of communication channels.

15. The method of extending the operating range of a cordless telephone pursuant to claim 14 wherein the arranging step further includes the steps of dedicating selected ones of the plurality of base units for respectively providing telephone service only to selected ones of the plurality of handset units and assigning each of these select ones of the base units to the selected ones of the handset units as dedicated base units.

16. The method of extending the operating range of a cordless telephone pursuant to claim 15 further comprising the step of arranging each dedicated base unit for monitoring a first specific communication channel selected by its assigned one of the plurality of handset units for receipt of a request-for-service signal from this handset unit.

17. The method of extending the operating range of a cordless telephone pursuant to claim 16 wherein each of the plurality of handset units select a second specific communication channel for obtaining telephone service from each of the plurality of base units and each dedicated base monitors this second specific communication channel in response to its assigned one of the plurality of handset units selecting this second specific communication channel.

18. The method of extending the operating range of a cordless telephone pursuant to claim 17 wherein each of the plurality of handset units has associated therewith a unique security code generated by the dedicated base unit, the specific communication channel being selected at its assigned handset unit for obtaining the telephone service from the plurality of base units.

19. The method of extending the operating range of a cordless telephone pursuant to claim 18 wherein the control unit controls the selection of the security code by the dedicated base unit for use by its assigned handset unit and further controls selection of the specific communication channel for use by this assigned handset unit, the control unit preventing the same security code and communication channel from being assigned to more than one of the plurality of handset units.

20. The method of extending the operating range of a cordless telephone pursuant to claim 14 further comprising the step of selecting a specific one of the plurality of communication channels by each one of the plurality of handset units for obtaining telephone service from each of the plurality of base units.

21. The method of extending the operating range of a cordless telephone pursuant to claim 20 further comprising the step of monitoring each communication channel selected by each one of the plurality of handset units for receipt of a request-for-service signal from any one of the plurality of handset units.

22. The method of extending the operating range of a cordless telephone pursuant to claim 21 wherein the monitoring step further comprises the step of cycling the second receiver in each shared base unit to the communication channel selected by each of the plurality of handset units for detecting the request-for-service signal.

23. The method of extending the operating range of a cordless telephone pursuant to claim 20 further comprising the step of polling each one of the plurality of base units for locating an identified one of the plurality of handset units, the polling step including sequentially transmitting a coded message signal from the second transmitter in each base unit over the specific one of the plurality of communication channels selected by the identified one of the plurality of handset units.

24. The method of extending the operating range of a cordless telephone pursuant to claim 23 wherein the coded message signal comprises a ring indication provided to the identified one of the plurality of handset units in response to receipt of an incoming call received by the control unit for this handset unit.

* * * * *